US010813192B2

(12) United States Patent
Hubbers et al.

(10) Patent No.: US 10,813,192 B2
(45) Date of Patent: Oct. 20, 2020

(54) METHODS, SYSTEM AND APPARATUS FOR CONTROLLING LUMINAIRES OF A LIGHTING SYSTEM BASED ON A MODE OF AN ENTERTAINMENT DEVICE

(71) Applicant: SIGNIFY HOLDING B.V., Eindhoven (NL)

(72) Inventors: Aloys Hubbers, Eindhoven (NL); Paulus Maria Johannes Oppeneer, Eindhoven (NL); Antonie Leonardus Johannes Kamp, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 9 days.

(21) Appl. No.: 15/723,810

(22) Filed: Oct. 3, 2017

(65) Prior Publication Data

US 2018/0098408 A1 Apr. 5, 2018

(30) Foreign Application Priority Data

Oct. 3, 2016 (EP) .................................... 16192020

(51) Int. Cl.
*H05B 47/105* (2020.01)
*H05B 47/19* (2020.01)
(Continued)

(52) U.S. Cl.
CPC ......... *H05B 47/105* (2020.01); *H05B 47/155* (2020.01); *H05B 47/19* (2020.01); *H05B 47/16* (2020.01)

(58) Field of Classification Search
CPC ....... G09G 2360/144; G09G 2360/145; G09G 5/02; G09G 5/026; G09G 5/06;
(Continued)

(56) References Cited

U.S. PATENT DOCUMENTS

| 7,228,190 B2* | 6/2007 | Dowling ................. | A63J 17/00 340/815.46 |
|---|---|---|---|
| 2006/0058925 A1 | 3/2006 | Diederiks et al. | |

(Continued)

FOREIGN PATENT DOCUMENTS

| WO | WO2008146235 A2 | 12/2008 |
|---|---|---|
| WO | 2015049617 A1 | 4/2015 |
| WO | 2016051365 A1 | 4/2016 |

*Primary Examiner* — Borna Alaeddini
(74) *Attorney, Agent, or Firm* — Meenakshy Chakravorty (57) ABSTRACT

A method of controlling luminaires of a lighting system based on a current mode of an entertainment device, the method comprising: whilst the entertainment device is in an active mode: controlling one or more of the luminaires associated with the entertainment device to render an entertainment effect, receiving a lighting instruction identifying a plurality of the luminaires and a lighting effect to be rendered by them, determining that at least a first of the plurality of luminaires is one of the luminaires currently rendering the entertainment effect, controlling at least a second of the plurality of luminaries, which is not currently rendering the entertainment effect, to render the lighting effect whilst the first luminaire continues to render the entertainment effect, and electronically storing an indication of the lighting effect; and in response to the entertainment device switching to an inactive mode, controlling the first luminaire to render the lighting effect using the electronically stored indication.

15 Claims, 7 Drawing Sheets

(51) Int. Cl.
*H05B 47/155* (2020.01)
*H05B 47/16* (2020.01)

(58) Field of Classification Search
CPC ........ G09G 5/12; H04N 21/4131; H04N 9/73;
H04N 5/58; H04N 21/4307; H04N 21/43;
H05B 37/029; H05B 37/02; H05B
39/042; H05B 47/105; H05B 47/19;
H05B 47/155; H05B 47/16; H05B
47/115; H05B 47/125; H05B 47/13;
H05B 47/135; H05B 47/14
See application file for complete search history.

(56) References Cited

U.S. PATENT DOCUMENTS

| | | | |
|---|---|---|---|
| 2010/0005062 A1* | 1/2010 | Van Den Dungen | H05B 47/155 707/E17.014 |
| 2010/0176752 A1 | 7/2010 | Xiong | |
| 2010/0244745 A1* | 9/2010 | Wendt | A63F 13/28 315/312 |
| 2010/0265414 A1* | 10/2010 | Nieuwlands | H05B 47/155 348/739 |
| 2011/0075036 A1* | 3/2011 | Galeazzi | H04N 5/64 348/602 |
| 2013/0147395 A1 | 6/2013 | Cook | |
| 2013/0198786 A1* | 8/2013 | Cook | H05B 37/0272 725/81 |
| 2014/0104498 A1 | 4/2014 | Li et al. | |

\* cited by examiner

METHODS, SYSTEM AND APPARATUS FOR CONTROLLING LUMINAIRES OF A LIGHTING SYSTEM BASED ON A MODE OF AN ENTERTAINMENT DEVICE

TECHNICAL FIELD

The present disclosure relates to systems and methods for controlling luminaires, i.e. lighting devices, to render a lighting scene in an environment.

BACKGROUND

US2013/147395A1 discloses rendering lighting effects on luminaires, wherein the effect is based on video content and wherein an effect can comprise a gradual return to a default state (e.g. the state of the luminaire before the light effect rendering based on video content started).

Electronic devices are becoming ever more connected. A "connected" device refers to a device—such as a user terminal, or home or office appliance or the like—that is connected to one or more such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user device such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of colored lighting, dimming options and/or dynamic effects. In terms of control the most common approach is to replace a light switch with a smartphone based app that offers extended control over lighting (for example Philips hue, LIFX, etc.).

A lighting scene is a particular overall lighting effect in an environment rendered by the light sources in that environment. E.g. a "sunset" scene may be defined in which the light sources are set to output hues in the red-yellow range of the visible spectrum. Each light source may for example output the different hues (or other setting such as saturation or intensity), or a scene may be rendered by all (or some) lights rendering a single color or similar colors. Note that lighting scenes may be dynamic in that the output of one or more light source changes over time.

Connected lighting systems are able to render lighting scenes by receiving lighting instructions over the network (e.g. a ZigBee network) from, for example, a user device such as a smart phone, and interpret the lighting instructions in order to determine the appropriate lighting settings for each light source in order that the lighting system renders a desired lighting scene in the environment.

SUMMARY

Connected lighting systems can be used to support or enhance various activities happening in a space such as a user's home. Most often these connected lights are used in home automation (timers, schedules, IFTTT signals, etc.) and atmosphere creation. The use of dynamic and colored lighting for creation of immersive atmospheres during movie watching or playing a game (or even playing music) is growing in popularity. A connected lighting system in entertainment mode is typically characterized by controlling the lights with a streaming flow of lights states. That is, the illumination provided by the lights is continually updated to accompany the entertainment (e.g. to match the overall color of a frame in a game or movie).

The inventors of the present invention have recognized a particular issue that can arise in this context, namely a situation in which a lighting effect to be rendered partially conflicts with an entertainment effect already being rendered—in the sense that at least one but not all of the luminaires to which the lighting effect is to be applied is currently rendering an entertainment effect. In prior art systems, during such an entertainment session, any home automation rule (such as a scene triggered by a timer) will either be not executed or if executed will be immediately overridden by the entertainment streaming.

Hence, according to a first aspect disclosed herein there is provided a method of controlling luminaires of a lighting system based on a current mode of an entertainment device, the method comprising: whilst the entertainment device is in an active mode: controlling one or more of the luminaires associated with the entertainment device to render an entertainment effect; receiving a lighting instruction identifying a plurality of the luminaires and a lighting effect to be rendered by them; determining that at least a first of the plurality of luminaires is one of the luminaires currently rendering the entertainment effect; controlling at least a second of the plurality of luminaires, which is not currently rendering the entertainment effect, to render the lighting effect whilst the first luminaire continues to render the entertainment effect; electronically storing an indication of the lighting effect; and in response to the entertainment device switching to an inactive mode, controlling the first luminaire to render the lighting effect using the electronically stored indication.

In embodiments, the method further comprises: whilst the entertainment device is in the active mode, receiving another lighting instruction identifying at least the first luminaire and another lighting effect to be rendered, and electronically storing an indication of the other lighting effect.

In embodiments, the lighting effect is selected for the first luminaire in favor of the other lighting effect in that: the first luminaire is controlled to render the lighting effect before the other lighting effect; or the electronically stored indication of the other lighting effect is replaced by the indication of the lighting effect thereby preventing the other lighting effect from being rendered by the first luminaire.

In embodiments, the lighting effect is selected in favor of the other lighting effect based on: a relative order in which the illumination instructions are received; user preference data; a respective priority level associated with each of the illumination instructions; and/or a respective type of each of the lighting effects.

In embodiments, indications of the lighting effect and the other lighting effect are stored in a stack, which is ordered based the relative order, the user preference data, the priorities, and/or the types.

In embodiments, the lighting effect has a limited duration type and the other lighting effect has an unlimited duration type, which causes the first luminaire to render the lighting effect before the other lighting effect irrespective of the relative order in which the illumination instructions are received.

In embodiments, the other instruction is received before the instruction and both lighting effects have an unlimited duration type, which causes the electronically stored indication of the other lighting effect to be replaced by the indication of the instruction such that the other lighting effect is not rendered by the first luminaire.

In embodiments, the method further comprises applying a transition effect to the first luminaire in response to the mode switch to dynamically transition from the entertainment effect to the lighting effect.

In embodiments, the first luminaire is controlled to emit, in rendering the lighting effect and/or the transition effect, a visual indication that the lighting effect is delayed.

In embodiments, the method further comprises: whilst the entertainment device is in an active mode, sending to a virtual luminaire executed on a processor and associated with the first luminaire a command to render the lighting effect; wherein the command is electronically stored by the virtual luminaire and relayed from the virtual luminaire to the first luminaire in response to the entertainment device switching to the inactive mode.

In embodiments, a representation of the stack is displayed on a graphical user interface of a user device in response to input from a user.

In embodiments, the indication of the lighting effect is electronically stored in a memory location local to a device implementing the storing step (e.g. in a user device or lighting bridge), or a remote memory location accessed via a network (e.g. a cloud-based memory accessible over the internet).

According to a second aspect disclosed herein, there is provided an apparatus for controlling luminaires of a lighting system based on a current mode of an entertainment device, the apparatus comprising: a communication interface for determining a mode of the entertainment device; and a controller arranged to: whilst the entertainment device is in an active mode: control one or more of the luminaires associated with the entertainment device to render an entertainment effect; receive a lighting instruction identifying a plurality of the luminaires and a lighting effect to be rendered by them; determine that at least a first of the plurality of luminaires is one of the luminaires currently rendering the entertainment effect; control at least a second of the plurality of luminaries, which is not currently rendering the entertainment effect, to render the lighting effect whilst the first luminaire continues to render the entertainment effect; and electronically store an indication of the lighting effect; and in response to the entertainment device switching to an inactive mode, control the first luminaire to render the lighting effect using the electronically stored indication.

According to a third aspect disclosed herein, there is provided a system comprising: the apparatus according to the second aspect or any embodiments thereof; the memory; and the plurality of luminaires.

According to a fourth aspect disclosed herein, there is provided a computer program product comprising computer-executable code embodied on a computer-readable storage medium arranged so as when executed by one or more processing units to perform the steps of the method according to the first aspect or any embodiments thereof.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Connected lighting can be used to support or enhance an entertainment session in a home such as a user watching a film, playing a game, or listening to music on an entertainment device. In any case, illumination can be provided by the lighting system which accompanies entertainment (entertainment effect), i.e. inputs to and/or outputs from the entertainment device, such as outputted media or inputs to a game console. That is, the lighting can correlate with the game being played (such as to match a frame of the game, a mood of the game, etc.), the movie being watch (such as to match a frame of the movie, a mood of the movie etc.), or the music being played (such as to match a mood of the music, or an album art of the music).

Connected lighting systems can also be controlled by home automation events (e.g. a scene change triggered by a timer or presence sensor etc.) and/or user input. While many incoming lighting commands might be ignored during the entertainment session, some might be important to the user. For example, a timer set to trigger a particular lighting effect, such as a "sunset" scene, might be important to the user to prompt them to go to bed. This can result in important lighting changes being lost (i.e. never shown to the user).

Current systems do not address this issue, as after the entertainment session is concluded the system sets the lights that were used during the entertainment session to either a default state or to the sate they were before the session took place. So the user will not be notified or informed about any events that could have occurred during the session. Also, the state of the lights use by the entertainment setup will probably not nicely match the state of the other lights (which may be in the same area). Embodiments of the present invention provide a method to address this issue.

In particular, existing systems do not address a scenario in which an attempt is made to apply a lighting to a plurality of luminaries, where at least one but not all of those luminaires are currently rendering an entertainment effect so as to provide an entertainment experience in conjunction with an entertainment device.

In the described embodiments, events that are incoming to a connecting lighting system are stacked during the entertainment session and after the session the system can use this stack of events to determine the right commands to send to the lights. For example if the new atmosphere was activated (e.g. with a tap switch) the lights that are not part of the entertainment setup would adjust its color immediately while the lamps that are part of the entertainment setup will only be adjusted after the entertainment session has ended.

The system maintains a 'shadow administration' of all lights used in the entertainment setup. Instead of sending home automation commands to the lights, they will be sent to the 'virtual lights' in the shadow administration. When the entertainment session has ended, the state of the shadow administration will be copied to the actual lights.

Figure 1:
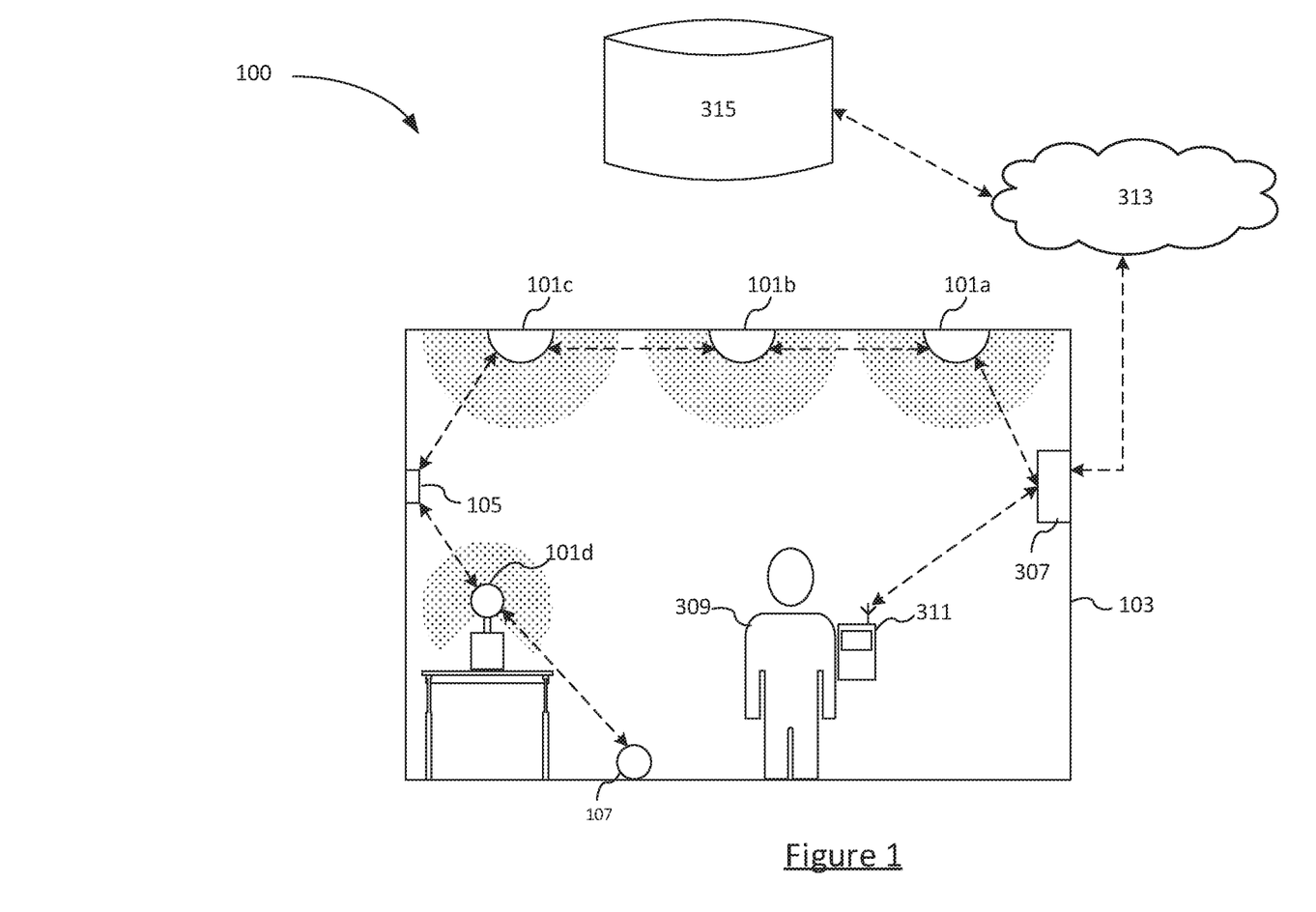
FIG. 1 shows a lighting system according to embodiments of the present invention.

FIG. 1 shows a system 100 according to embodiments of the present invention. An environment 103 contains a plurality of luminaires 101a-d and a switch 105. Luminaires 101a-c are ceiling type luminaires designed to provide illumination in the environment 103 from above. Luminaire 101d is a free-standing lamp type luminaire placed on a table designed to provide illumination in the environment 103 from a lower position than the ceiling type luminaires 101a-c. Each of the luminaires 101a-d may be any suitable type of luminaire such as an incandescent light, a fluorescent light, an LED lighting device etc. The plurality of luminaires 101a-d may comprise more than one type of luminaire, or each luminaire 101a-d may be of the same type.

A basic luminaire may consist simply of a light bulb or bulbs (e.g. LED, a filament bulb or gas-discharge lamp) and any associated support structure. Other luminaires may also comprise, for example, an associated casing or housing though others may not. A luminaire can take the form of a traditional ceiling or wall mounted room luminaire, or free standing luminaire (such as a floor or table lamp, or portable luminaire); or it may take a less traditional form such as an LED-strip embedded in or installed on a surface or item of furniture, a wall washer, or any other form of illumination device adapted to provide illumination specifically. Components for communicating with a bridge 307 (e.g. dedicated circuity, FPGA, processors and accompanying software (e.g. firmware) as applicable) may be incorporated in a light bulb with a standard fitting, to allow easy retrofitting of connected lighting functionality into existing, non-specialized lighting systems. However, this is not essential and in general these communication components can be incorporated at any suitable location in the lighting system to allow communication between the luminaires and the bridge 307.

It is noted that the terms "luminaire", "light source" and "illumination source" are used interchangeably herein, to refer to a device which emits not just any light, but specifically illumination, i.e. light on a scale suitable for contributing to the illuminating of an environment occupied by one or more humans (so that the human occupants can see within the physical space as a consequence). Note also that the term "lighting" also refers to illumination in this sense.

The switch 105 is shown in FIG. 1 as a wall-mounted switch and may be any suitable type of switch allowing user input to control the plurality of luminaires 101a-d. For example, the switch 105 may be a simple on-off controller switch or may allow for more complex control such as dimming and possibly even control of individual lighting characteristics such as hue and saturation. The switch 105 may also be a portable switch (portable remote control) capable of being moved from one environment to another. The term "switch" is used herein to refer to any control device allowing a user to input commands into the lighting system.

The plurality of luminaires 101a-d, the switch 105, along with a lighting bridge 307 form a connected lighting network. That is, they are all interconnected by wired and/or wireless connections, indicated by dotted lines in FIG. 1. In particular, FIG. 1 shows "chaining" connections such as may be implemented in a ZigBee lighting network, wherein it is not necessary for each device to be directly connected to each other device. Instead, devices are able to relay communication signals which allows for, for example, luminaire 101c to communicate with the lighting bridge 307 by relaying data through luminaires 101b and 101a to lighting bridge 307. However, it is not excluded that other network topologies may be employed. For example, a "hub-and-spoke" topology may be used in which each device is directly connected (e.g. wirelessly) to the lighting bridge 307 and not to any other devices in the network.

As another example, each luminaire in the network may be configured according to one communication protocol, such as ZigBee, and the switches may be configured according to another communication protocol, such as WiFi. Hence, it is appreciated that the luminaires may communicate with each other and the lighting bridge 307 without relaying data through a switch as shown in FIG. 1, and the switch 105 may communicate directly with the lighting bridge 307. In any case, it is understood that the lighting bridge 307 is able to communicate, by whatever appropriate means, with each other device in the lighting network.

Lighting bridge 307 is arranged at least to receive input (e.g. from switch 105) and to send lighting control commands to luminaires 101a-d.

FIG. 1 also shows a user 309 and user device 311 such as a smart phone. The user device 311 is operatively coupled to the lighting bridge 307 by a wired or wireless connection (e.g. WiFi or ZigBee) and hence forms part of the lighting network. User 309 can provide user input to the lighting bridge 307 via the user device 311 using, for example, a graphical user interface of the user device 311. The lighting bridge 307 then interprets the user input and sends control commands to the luminaires 101a-d accordingly. As mentioned above, the user device 311 generally allows for more complex control than the switch 105. For example, the user 309 may use the user device 311 to control an individual luminaire. In general it is desirable that the switch to control the luminaires in the same environment as the switch itself, i.e. in FIG. 1 switch 105 controls only luminaires 101a-d, but the user device 311 may control any luminaire at all within the lighting network. For example, the user 309 may use the user device 311 to control a luminaire in another environment, such as controlling a luminaire in a different room other than the room in which the user 309 and user device 311 are currently. This is particularly advantageous because the user device 311 is generally more portable than a switch (particularly a wall-mounted switch), and hence may be used at different physical locations. The user device 311 may be used to control the plurality of luminaires 101a-d to render a lighting scene, e.g. by the user 309 selecting the lighting scene and desired luminaires using a GUI of the user device 311.

As illustrated in FIG. 1, lighting bridge 307 may also be provided with a wide area network (WAN) connection such as a connection to the internet 313. This connection, as known in the art, allows the lighting bridge 307 to connect to external data and services such as memory 315. Note that the wireless connection between user device 311 and the lighting bridge 307 is shown in FIG. 1 as a direct connection, but it is understood that the user device 311 may also connect to the lighting bridge 307 via the internet 313.

A sensor 107 is present within the environment 103 and is arranged to detect the presence of users within the environment 103. The sensor 107 is part of the lighting network in that it is arranged to communicate with the network via a wired or wireless connection. That is, the sensor 107 is arranged to at least be operatively coupled to the lighting bridge 307.

Although shown in FIG. 1 as a single entity, it is understood that any suitable sensor or plurality of sensors may be used to provide the functionality ascribed herein to the sensor 107. For example, the sensor 107 may comprise a sensor arranged to detect the presence of users directly, such as a near infra-red sensor, a camera, an ultrasonic sensor, or other sensors known in the art. As a further example, the sensor 107 may comprise a sensor arranged to detect the presence of users indirectly, e.g. by detecting the presence and/or location of a user device 311 carried by the user. In this case, the sensor 107 may comprise a plurality of signaling beacons arranged to communicate with the user device 311 to determine its location, as known in the art.

Figure 2:
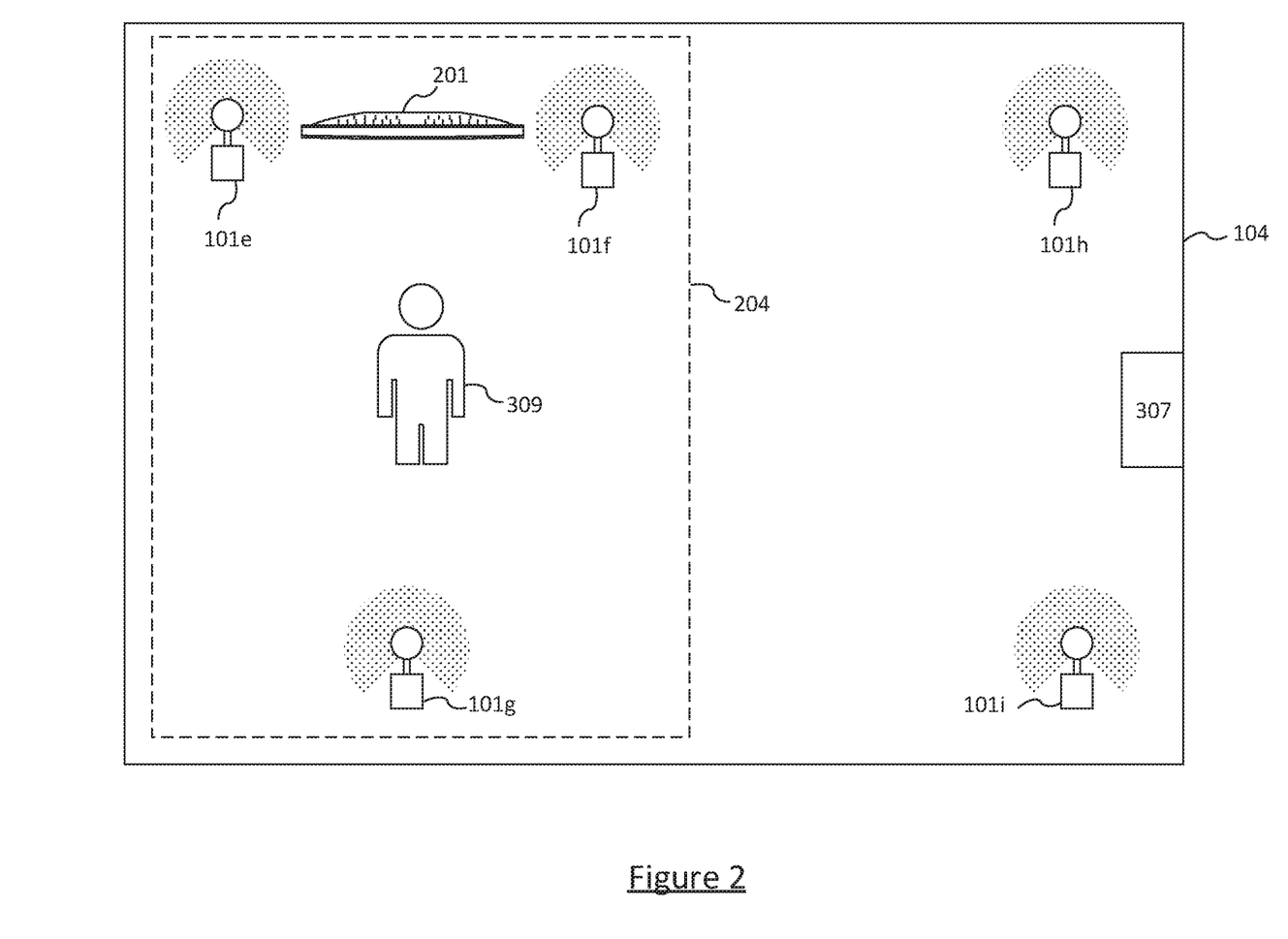
FIG. 2 shows an example installation of a lighting system within a space.

FIG. 2 shows a simplified diagram of an example installation of the lighting system 100 of FIG. 1 in a space 104. As mentioned above, the lighting system 101 may comprise any number of luminaires 101. In the example of FIG. 2, the lighting system comprises a plurality of luminaires 101e-i and bridge 307. The luminaires 101e-i are connected to the bridge 307 such that the bridge 307 can communicate control signals to the luminaires. In this manner, it is understood that the luminaires 101e-i form a lighting network controlled by the bridge 307.

An entertainment device (media device) 201 is shown located in the space illuminated by the lighting system 101. The media device 201 is capable of outputting a piece of video content, such as a video file, by displaying frame images (frames) of the video content in quick succession on a display of the media device 201 in the conventional manner, whilst simultaneously outputting any accompanying audio data of the video content via loudspeaker(s). The media device 201 is shown in FIG. 2 at a moment in time at which it is displaying a frame of the video content.

The media device 201 is a television (TV), such as a smart TV, in this example, which is shown placed near a wall of the space 104. However, it can take other suitable forms (such as a game console or audio system), and may for example comprise an image projector arranged to project the frame images into onto a surface of the illuminated space, a virtual reality (VR) and/or augmented reality (AR) headset that is worn by a user such as user 309 occupying the space, or even a general purpose computer device such as a tablet, desktop or laptop computer, or smartphone, or any other media device that is configured to output (i.e. play out) the video content in the space illuminated by the luminaires 101e-i of the lighting system 101.

In the example of FIG. 2, user 309 is engaged in an entertainment activity involving media device 201. For example, the user 309 is watching a movie on a television. Luminaires 101e and 101f are place either side of media device 201 and luminaire 101g is behind the user. Together, luminaires 101e-g are within an "entertainment area" ("entertainment region") 204 and provide illumination which accompanies the movie—an example of an entertainment effect. The entertainment area 204 is shown in FIG. 2 by a dotted box corresponding to a physical region of the space 104. However, it is understood that the term "entertainment area" is used herein broadly to refer to any luminaires sufficiently close to the media device 204 to provide accompanying illumination. Similarly, luminaires 101h and 101i are shown in FIG. 2 on the other side of the space 204, outside of the entertainment area 204.

An association between the luminaires and the media device 201 is stored in memory 315. That is, memory 315 stores an indication of which luminaires are within the entertainment region 204 and which are not. Memory 315 is accessible by the controller 401 and therefore it is understood that the controller 401 can used the stored indication in order to determine which luminaires to control according to the entertainment session. Memory 315 is shown in FIG. 1 as a cloud-based memory 315, e.g. an external storage facility accessible over the internet. However, the memory 315 may also be a local memory of the user device 311, or a memory implemented in the bridge 307.

The controller 401 is able to determine the operational mode of the entertainment device 201 by the receiving (and optionally sending) of data via a communication interface (not shown). Hence, the communication interface may be used to receive an indication from the entertainment device that the entertainment device has switched to an inactive mode. Or, more generally, the communication interface may be used to determine the operational mode of the entertainment device (i.e. whether the entertainment device is in an active mode or an inactive mode). This may be done by direct communication between the apparatus and the entertainment device, or by the apparatus receiving data from a device (e.g. the user device 311) other than the entertainment device which stores an indication of the operational status of the entertainment device. For example, the controller 401 may communicate with the user device 311 in order to determine the operational mode of the entertainment device 201 as the user device 311 in general may store an indication of whether or not the entertainment device 201 is in the active mode. That is, the user device 311 may be running an application which controls the entertainment device 201 to be in an active mode (e.g. the user 309 may have used user device 311 to control the entertainment device 201 to play video content, in which case the controller 401 can determine that the entertainment device 201 is active by communicating with the user device 311 via the communication interface).

If the media device 201 is not in use, then luminaires 101e-i function only as illumination within the space 104. In this sense it is understood that various timers and other triggers for lighting scene changes may be implemented using luminaires 101e-i. For example, a sensor such as presence sensor 107 (not shown in FIG. 2) might trigger luminaires 101e-i to render a bright white lighting scene in response to detection of a presence of a user within the space 104.

When the media device 201 is in use, luminaires 101e-g provide illumination which accompanies the entertainment being provided by media device 201, and luminaires 101h and 101i function as normal. That is, they do not provide accompanying illumination.

If the same bright white lighting scene as described above is then triggered, luminaires 101h and 101i will render the lighting scene as before, but luminaires 101e-g are "occupied" providing entertainment-accompanying illumination. In prior art systems, luminaires 101e-g would have responded to the trigger by rendering the bright white scene but this effect would have only lasted a short time until the next lighting command relating to the entertainment causes luminaires 101e-g to return to accompanying the entertainment on media device 204.

In contrast, the described embodiments of the present invention determine, for a command related to a light effect, whether it should be executed while at least part of the lighting system if providing light effects related to media content (TV, game). Further, a light effect for a lamp can be cached until it exits an entertainment mode.

Figure 3:
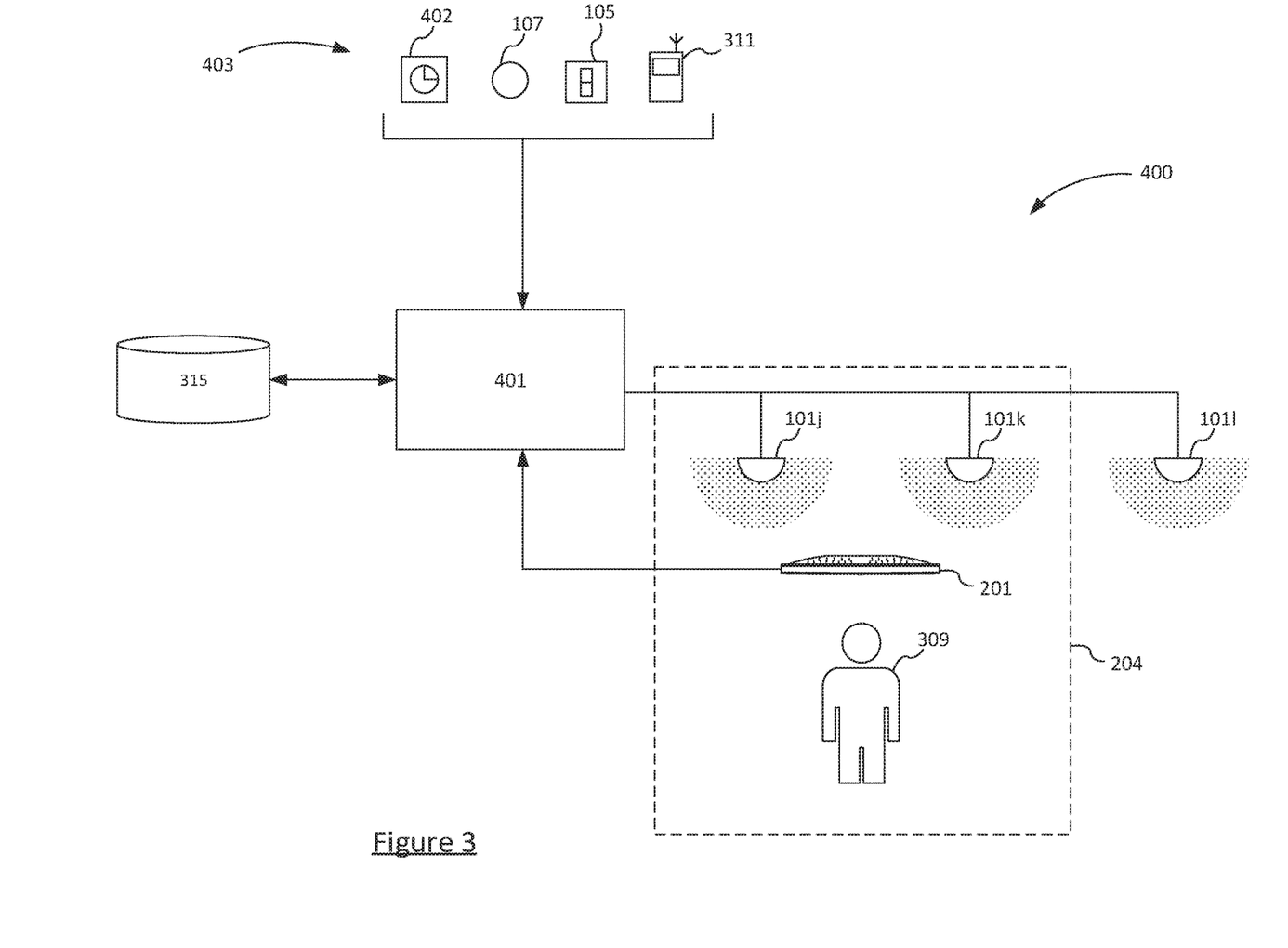
FIG. 3 is a functional block diagram of a controller according to embodiments of the present invention.

FIG. 3 shows a control system 400 according to the present invention. The control system 400 comprises a lighting controller 401, the memory 315, the plurality of luminaires 101j-l, and the media device 201. The lighting controller 401 is arranged to control the luminaires 101j-l in the manner described above. The controller 401 has access to memory 315 which may be a remote memory accessible over a network such as the internet or may be a local memory implemented at the controller 401 itself. The controller 401 is arranged to receive input from a variety of sources 403 such as timer 402, sensor 107, switch 105, and/or user device 311 as shown in FIG. 3. The controller 401 is also arranged to receive an input from media device 201 indicative of an entertainment mode of the media device 201. When the media device 201 is in an "active" mode, the controller 401 controls the luminaires within the entertainment region 204 (luminaires 101*j* and 101*k* in FIG. 3) to render an entertainment effect, i.e. a specific type of lighting effect which accompanies an entertainment experience provided by media device 201. When the media device 201 is in an "inactive" mode, the controller 401 controls the luminaires 101*j* and 101*k* in the same manner as luminaires outside of the entertainment region 204 (i.e. luminaire 101*l* in FIG. 3).

The control system 400 is implemented by the lighting hardware shown in FIG. 1 (e.g. the specific example system shown in FIG. 2). Hence, it is understood that memory 315 shown in FIG. 3 corresponds to memory 315 also shown in FIG. 1, and that luminaires 101*j-l* correspond to example luminaires forming all or part of the plurality of luminaires shown in FIG. 1. The controller 401 is preferably implemented in either the user device 311 or the bridge 307, but it not prohibited that the controller 401 may also be implemented in any other suitable device such as one of the luminaires 101*j-l*, the switch 105, or the sensor 107. Further, it is understood that the controller 401 may be implemented in a distributed fashion, with two or more separate physical device providing different parts of the controller functionality described below. For example, steps of controlling the luminaires 101*j-l* may be implemented by a first controller module of the controller 401 implemented in the bridge 307, while steps of storing to and accessing the memory 315 may be implemented by a second controller module of the controller 401 implemented in the user device 311.

The entertainment experience is provided by the entertainment device (media device 201) outputting media content (e.g. audio and/or video content), either pre-recorded media content (such as video or music) or dynamically rendered content in response to user input (e.g. as part of a game).

As mentioned above, a variety of sources 403 can provide lighting instructions to the controller 401 which cause the controller 401 to control the plurality of luminaire 101*j-l* accordingly. This may comprise the controller 401 accessing memory 315. For example, timer 402 may provide an input of the current time, in response to which the controller 401 may access memory 315 and identify that a particular lighting scene is to be rendered at that time based on a stored indication in memory 315.

Now consider the case where the media device 201 is in an active mode, i.e. providing an entertainment experience to the user 309, and the controller 401 is controlling luminaires 101*j* and 101*k* within the entertainment region 204 to render lighting effects which accompany the entertainment being provided by media device 201. As before, one or more of the sources 403 may provide lighting instructions to the controller 401 which would normally cause the controller 401 to control all of the luminaires 101*j-l* to render a lighting effect. However, user 309 is enjoying an accompanying lighting effect being rendered by luminaires 101*j* and 101*k*, and rendering the lighting effect on these luminaires would be disruptive.

Incoming events to the controller 401 are stored by the controller 401, i.e. stored in memory 315 in a priority stack, e.g. in a cache of the memory 315 during the entertainment session (when the media device is in active mode). Then, after the session ends (the media device 201 switches to inactive mode wherein the entertainment experience ends) the controller 401 uses this stack of events stored in memory 315 to determine the right commands to send to the luminaires. Using this approach, when the new atmosphere is activated (e.g. with switch 105) the luminaires that are not part of the entertainment region (luminaire 101*l* in FIG. 3) adjusts its color immediately while luminaires 101*j* and 101*k* (which are within entertainment region 204) will only be adjusted after the entertainment session has ended.

In other words, lighting instructions which are received whilst the media device 201 is in the active mode are rendered only on any luminaires which are not part of the entertainment effect rendering. The received lighting instructions are also "cached" to memory 315. Then, when the media device 201 switches to inactive mode, the cached lighting instructions are processed to determine lighting effects to be rendered by the luminaires which were previously part of the entertainment effect.

Lighting instructions (also called commands) can be of various types. Particularly, they may be "temporary" or "permanent". A temporary command is one which causes the luminaires to render a short lighting effect such as a pulse of color, whereas a permanent command causes the luminaires to render a long-term lighting effect such as changing to a different scene. The luminaires then continue to render this different scene until further commands are received. This is in contrast to the temporary effects, after which the lighting system automatically returns to rendering the lighting effect which was being rendered before the temporary effect.

The right command or sequence of commands which the controller 401 should enact following the switching of the media device 201 to inactive mode can be determined based on different factors including:

Temporality, i.e. the command that only temporally changes the lights e.g. light blinking several times to indicate incoming email vs. permanent change like scene setting command. If during the session both types of commands where sent, the temporal command might still be played after the session but the final light setting will correspond to the permanent one.

Order, i.e. if during the session different light scenes where recalled, after the gaming session only the last scene will determine the state of the entertainment lights.

User preferences. The user might define the importance of the specific command ensuring that it will be replayed after the entertainment session.

Figure 4A:
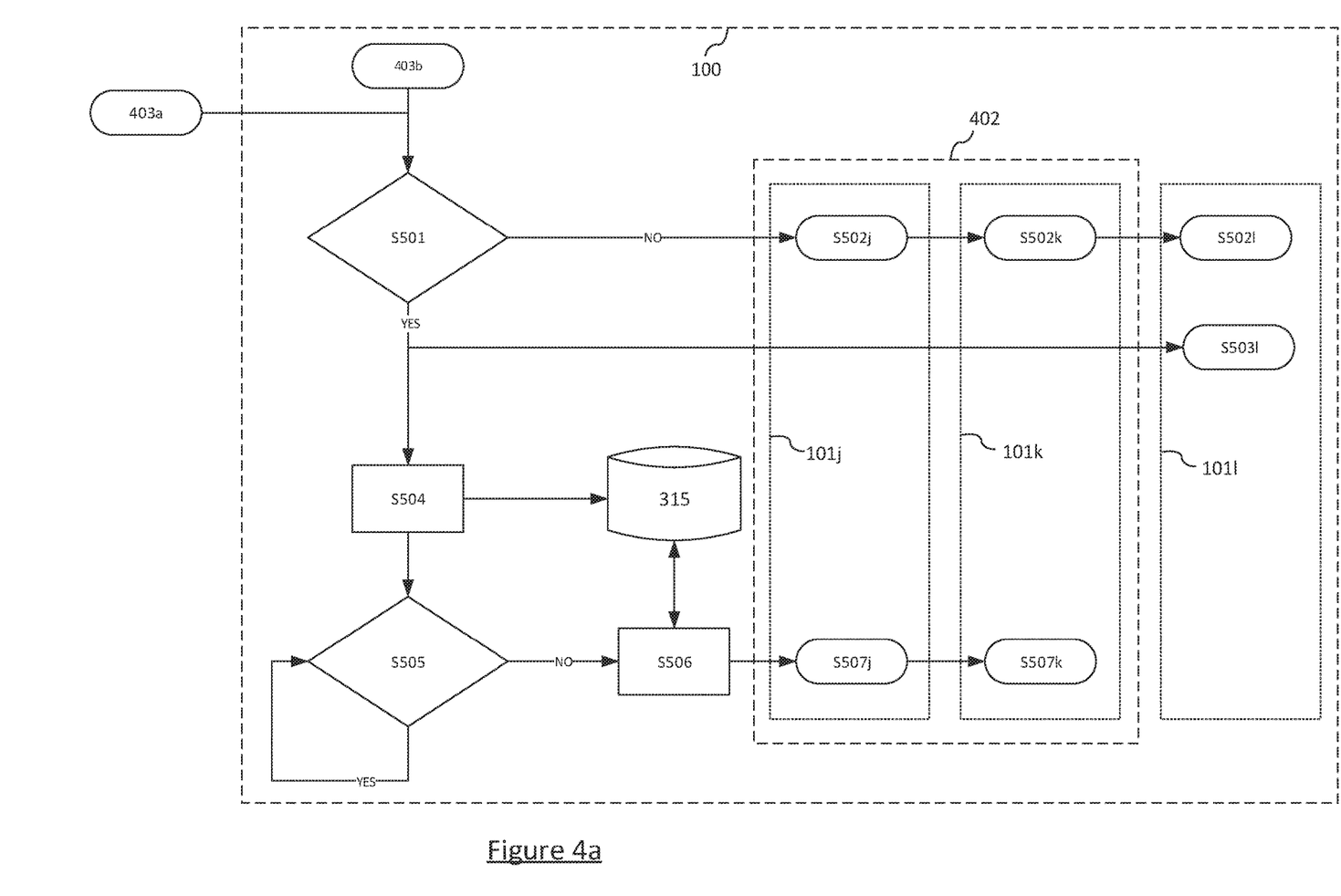
FIGS. 4a-c show example flowcharts of method implemented by the lighting system.

FIG. 4*a* shows a flowchart of a method implemented by controller 401 in accordance with embodiments of the present invention. The steps within the dotted box 100 indicate steps performed by the lighting system 100. Similarly to FIG. 3, boxes 101*j-l* indicate steps performed at luminaires 101*j-l* respectively and box 204 indicates entertainment area 204.

At step S501, the controller 401 receives input from either an external input 403*a* (e.g. user device 311) or an internal input 403*b* (e.g. an internal timer 402), and in response thereto determines whether the media device 201 is in an active mode.

If the media device 201 is not in an active mode, this means that the luminaires in the entertainment region 204 are not "busy" rendering an accompanying entertainment effect and therefore all the luminaires in the space can be updated in response to the input. The controller 401 proceeds to step S502*j-l* and controls all the luminaires 101*j-l* to render the effect.

If, on the other hand, the media device 201 is in an active mode, this means that the luminaires in the entertainment region 204 are "busy" and thus should not (yet) be controlled to render the effect. The controller 401, at step S503*l*, controls only the luminaires outside of the entertainment region 204 to render the effect (luminaire 101*l* in this example). The controller also, at step S504, adds the event to the stack by storing the input to memory 315.

The controller 401 then monitors the mode of the media device 201 at step S505, which is indicated by a loop in the flow chart. As long as the medium device 201 stays in the active mode, the controller 401 waits. Note however, that further input may be received in this time, in which case the controller 401 reverts to step S501 and performs the same steps as described above.

Once the controller 401 determines that the media device 201 is in an inactive mode, it proceeds to step S506 in which the stack is retrieved from memory 315 and processed.

In a simple embodiment, the lighting effect triggered by the input (which was rendered on luminaire 101*l*, above) is simply stored to memory 315 at step S504 and then retrieved at step S505 in order to render the effect at luminaires 101*j-k*, allowing the luminaires which were part of the entertainment effect to "catch up" to the lighting in the rest of the system. However, there are other ways in which the stack can be handled after the entertainment session is concluded. For example:

Multiple scene recalls either through app, sensors or connected switch. Since recalling the scene will overwrite the setting of the previous scene(s) (if same lamps are part of it) only the last recalled scene for each lamp should be stored in the stack and activated after the entertainment session is finished.

For IFTTT signaling events (e.g. blinking of the luminaires to notify about new email), the events can have timeout e.g. if entertainment session is finished within the predefined time than the signal is still played if not signal is dropped.

Some commands might be fully ignored, for example "all lights off" might be ignored for safety reasons—when entertainment session is concluded immediately switching all lights off might be undesirable behavior. In some situation even if the command is ignored it might influence the behavior of the system after entertainment session is finished. For example if a scene was activated and then "all lights off" was activated then even if the lights off command is dropped, after the entertainment session is finished instead of activating the scene the default light setting might be activated.

However the appropriate lighting effect to be rendered is determined, the controller 401 proceeds to step S507*j-k* in which it controls the luminaires which were in the entertainment region 204 to render the determined lighting effect.

Figure 4B:
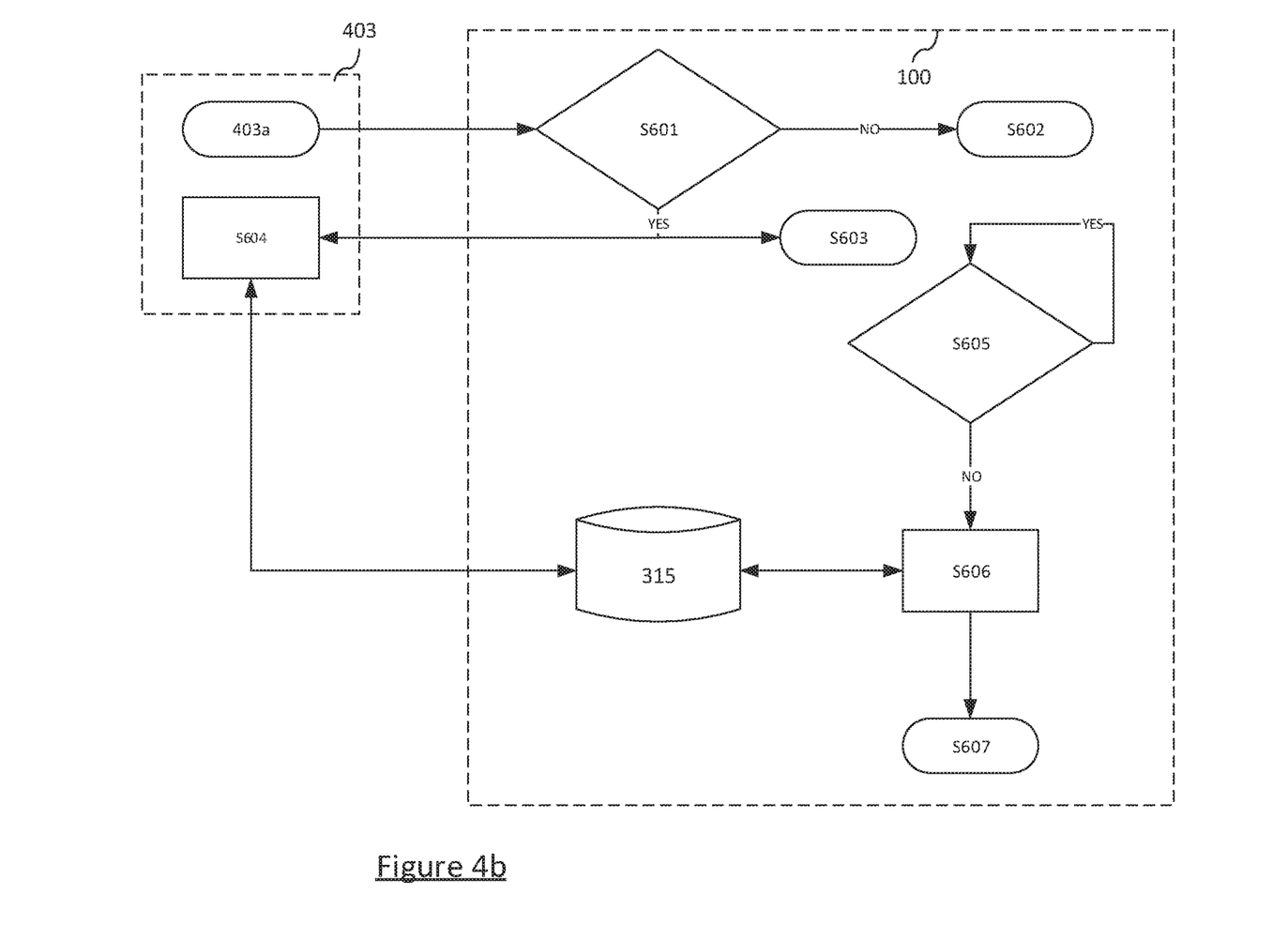
Figure 4C:
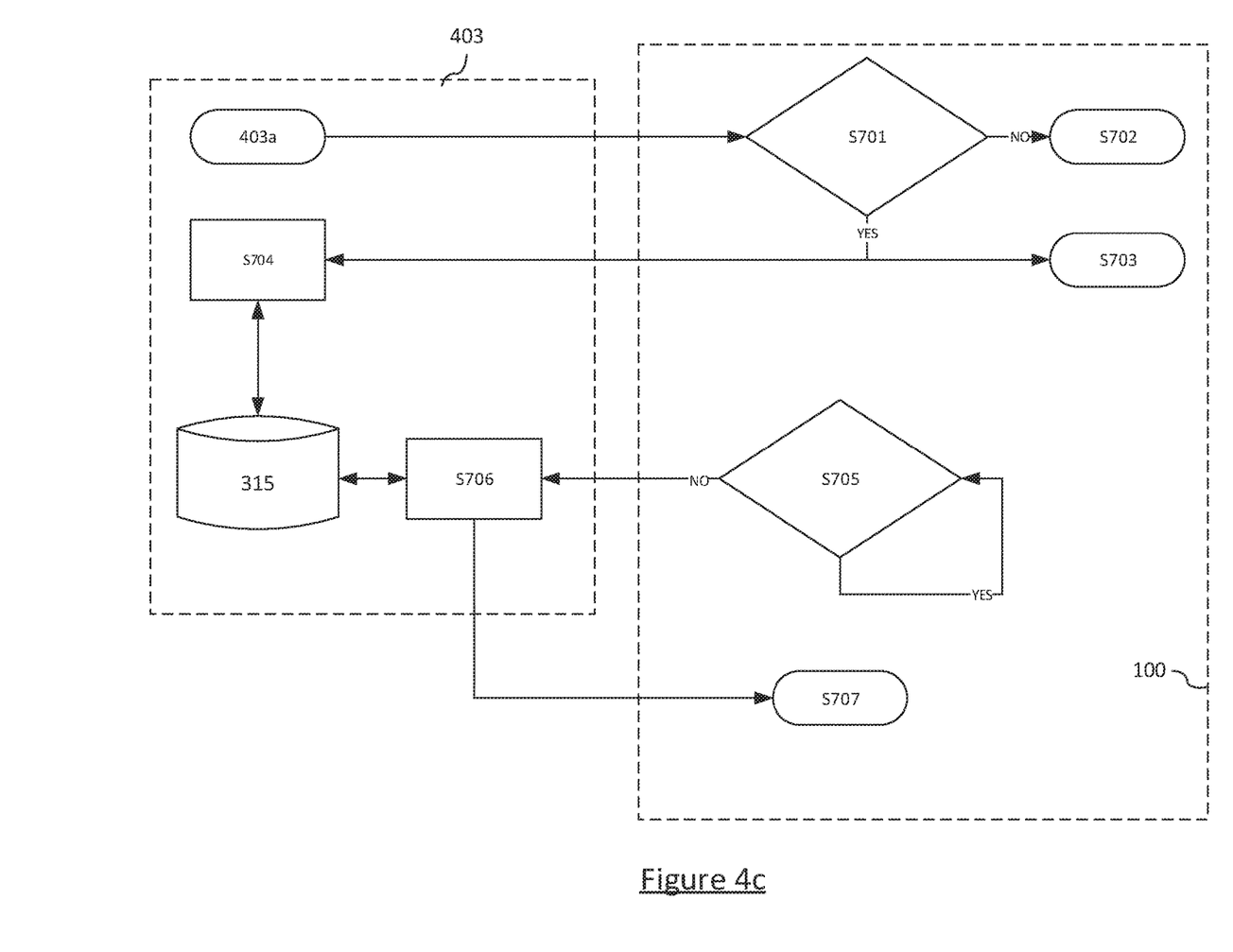

FIGS. 4*b* and 4*c* show alternative methods in which some steps are performed by an external system (e.g. one of the external sources 403). For the sake of clarity, the rendering steps are not individually shown for individual luminaires as in FIG. 4*a*.

In both FIGS. 4*b* and 4*c*, when the external system 403 provides input the controller 401, the controller 401 determines at step S601 (S701 in FIG. 4*b*) whether the media device 201 is in the active mode. If it is, then the controller 401 can proceed to step S602 (S702) and render the effect on the luminaires. If the media device 201 is in the active mode however, then the controller 401 renders the effect only on the luminaires outside the entertainment region at step S603 (S703). The controller 401 then also informs the external system 403 that the lighting effect was not rendered by some luminaires.

The external system 403 itself then caches the lighting effect to memory 315 at step S604 (S704). From here the methods of FIGS. 4*b* and 4*c* differ.

In FIG. 4*b*, the external system does not perform any further steps; it has cached the lighting effect to memory 316 to which the lighting controller 401 has access, and therefore, the lighting controller 401 proceeds as described above in relation to FIG. 4*a* (steps S505-507). That is, the controller 401 maintains the loop at step S605 to check the mode of the media device 201 and when it determines the media device 201 has switched to inactive mode it proceeds to step S606 wherein the cached stack is retrieved from memory 315 and processed to determine the lighting settings as described above. These settings are then used to control the luminaires accordingly at step S607.

In FIG. 4*c* on the other hand, the external system 403 maintains the cached stack itself (e.g. on a local memory). Simultaneously, the controller 401 checks the mode status of the media device 201 (again illustrated by a loop at step S705). When the controller 401 determines that the media device 201 has switched to an inactive mode, it informs the external system 403 of the inactive status of the media device 201. In this method, the external system 403, at step S706, is the entity which performs the retrieval and processing of the stack to determine lighting settings. The determined lighting settings are then provided to the controller 401 for rendering at step S707.

Figure 5:
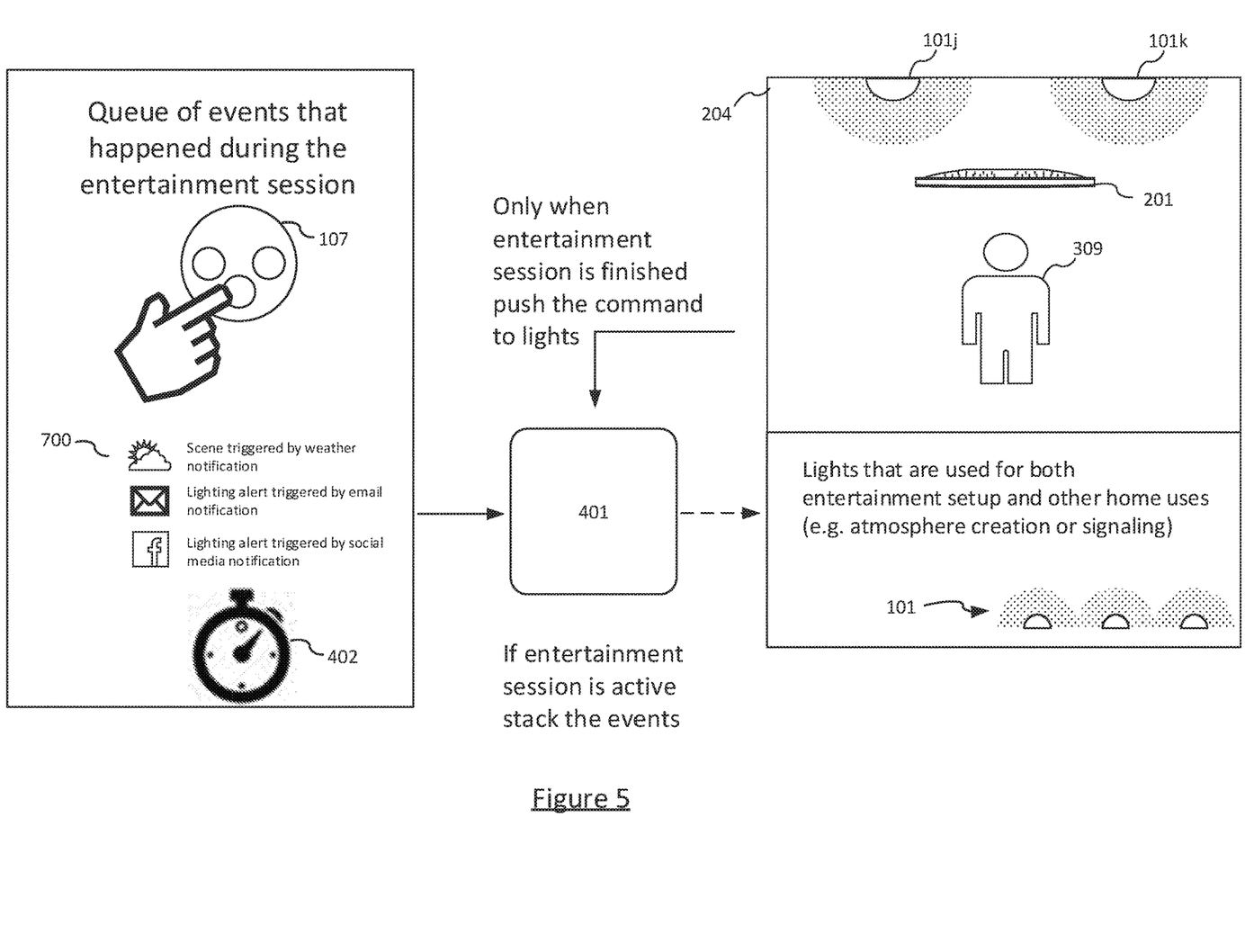
FIG. 5 shows a high level diagram of an event stack according to the present invention.

FIG. 5 shows an overview of the operation of the present invention, including an example of the cached stack 700 of lighting commands, the switch 107, the timer 402, the controller 401, and the luminaires 101. The stack 700 is shown in FIG. 5 as a list of control commands which are stored on memory 315. The stack 700 may be manipulated in accordance with methods described herein. That is, commands can be added to the stack 700, removed from the stack 700, and modified in the stack 700.

In particular, the stack 700 may be displayed to the user 309 via a user interface such as a graphical display on the user device 311. That is, the stack 700 may be displayed in a lighting control app being run on the user device 311. The stack 700 is shown in FIG. 5 as it might appear to the user 309. This is especially beneficial in cases where the set of luminaires to which the incoming control command is to be applied is the same as the set of luminaires currently providing the entertainment effect. This is because in these cases no luminaire would immediately render the effects which are cached to the stack 700 and therefore it is advantageous to allow the user 309 to view the stack 700 for informational purposes (i.e. allowing the user 309 to be informed of the lighting effects he has missed).

Allowing the stack 700 to be visible by users is also beneficial in multi-user scenarios where the event notifications via lighting commands are important to one user, whilst another user is enjoying the entertainment effect (e.g. playing a game). The user playing the game is then also able to view the stack 700 to check events he might have missed, without having to end the entertainment effect.

The following are three usage examples of the present invention for the purposes of understanding only.

In a first example, a user is playing a video game with lamps A, B and C providing light effects related to the game; when a further user enters the home (triggering geofencing rules, triggering a sensor, pushing button, setting a scene via the app) this would normally cause lamps C, D and E to turn on (to a specific color and light level). Such would deteriorate the gaming experience, thus the system triggers only lamps D and E to turn on. When the user stops playing the game, lamp C is set to the correct light output such that the scene of C, D and E is then complete.

In a second example, a user has set a rule that causes lamps to flash when an email is received. While in the entertainment mode such light feedback is cached, and the flash only occurs when the user exits the entertainment mode (e.g. upon a check whether the triggering condition is still true).

In a third example, Frank is playing a game that is enabled with accompanying lighting effects. The game controls some of the room's lights. During this gaming session, his father presses a switch that changes the light settings in the room including the game controlled lights. Yet during the gaming session the light changes are send to all lights in the room, except for the light controlled by the game. Sometime after, a programmed trigger created by Frank flashes the lights indicating a received mail. Yet only to the non-game controlled lights. After the gaming session, system evaluates stack of the events for the lights controlled by the game. Because of personal preference indicated by Frank when he made the trigger, the trigger event is played back flashing the light indicating to Frank that a mail has been received. After that the light is restored to the light settings set by this father.

It will be appreciated that the above embodiments have been described only by way of example. Other variations to the disclosed embodiments can be understood and effected by those skilled in the art in practicing the claimed invention, from a study of the drawings, the disclosure, and the appended claims.

For example, the stack stored in memory 315 can include temporary lighting effects like alerts. These short effects can be played immediately upon switching of the media device 201 to inactive mode. These can be rendered:
  Before or after restoring shadow administration
  With a different effect to show they are delayed
  Only on entertainment lights or all lights
  In sequence or only highest priority alert Further, the user 309 could be provided with an option for certain commands should not be part of the shadow administration.

Further, the user 309 could be provided with an option to select only certain alerts which are to be rendered following the switching to inactive mode (other types of alerts can be ignored, i.e. not cached to memory 315). For example, the user 309 may specify that only alerts pertaining to email are to be rendered.

The system implicitly or user explicitly would need to define the priorities for different events (lighting commands), such that some effect would not be played at all after the gaming session, and some might be rearranged and played in specific not necessarily time based (FIFO or LIFO) order.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling luminaires of a lighting system based on a current mode of an entertainment device, the method comprising:
  whilst the entertainment device is in an active mode:
    controlling one or more of the luminaires associated with the entertainment device to render an entertainment effect,
    receiving, while said one or more of the luminaires is rendering said entertainment effect, a lighting instruction identifying a plurality of luminaires and a lighting effect to be rendered by the plurality of luminaires,
    determining, in response to the receiving the lighting instruction, that at least a first luminaire of the plurality of luminaires is one of the luminaires currently rendering the entertainment effect, and suspending, in response to said determining, implementation of said lighting instruction by the first luminaire,
    controlling, in response to the receiving the lighting instruction, at least a second luminaire of the plurality of luminaries, which is not currently rendering the entertainment effect, to implement the lighting instruction by rendering the lighting effect whilst the first luminaire continues to render the entertainment effect and whilst the first luminaire is suspended from implementing the lighting instruction, and
    electronically storing an indication of the lighting effect; and
  in response to the entertainment device switching to an inactive mode, controlling the first luminaire to implement the lighting instruction by rendering the lighting effect using the electronically stored indication.

2. The method according to claim 1, wherein the lighting effect is a first lighting effect, wherein the lighting instruction is a first lighting instruction and wherein the method comprises:
  whilst the entertainment device is in the active mode, receiving an other lighting instruction identifying at least the first luminaire and an other lighting effect to be rendered, and electronically storing an indication of the other lighting effect.

3. The method according to claim 2, wherein the first lighting effect is selected for the first luminaire in favor of the other lighting effect in that:
  the first luminaire is controlled to render the first lighting effect before the other lighting effect, or
  the electronically stored indication of the other lighting effect is replaced by the indication of the first lighting effect thereby preventing the other lighting effect from being rendered by the first luminaire.

4. The method according to claim 3, wherein the first lighting effect is selected in favor of the other lighting effect based on at least one of:
  a relative order in which the first lighting instruction and the other lighting instruction are received,
  user preference data,
  a respective priority level associated with each of the first lighting instruction and the other lighting instruction, and
  a respective type of each of the first lighting effect and the other lighting effect.

5. The method according to claim 4, wherein the indications of the lighting effect and the other lighting effect are stored in a stack, which is ordered based on at least one of the relative order, the user preference data, the respective priority levels or the respective types.

6. The method according to claim 5, wherein a representation of the stack is displayed on a graphical user interface of a user device in response to input from a user.

7. The method according to claim 2, wherein the first lighting effect has a limited duration type and the other lighting effect has an unlimited duration type, which causes the first luminaire to render the first lighting effect before the other lighting effect irrespective of the relative order in which the first lighting instruction and the other lighting instruction are received.

8. The method according to claim 2, wherein the other lighting instruction is received before the first lighting instruction and both the first lighting effect and the other lighting effect have an unlimited duration type, which causes the electronically stored indication of the other lighting effect to be replaced by the indication of the first lighting effect such that the other lighting effect is not rendered by the first luminaire.

9. The method according to claim 1, comprising applying a transition effect to the first luminaire in response to the entertainment device switching to the inactive mode to dynamically transition from the entertainment effect to the lighting effect.

10. The method according to claim 9, wherein the first luminaire is controlled to emit, in rendering the lighting effect and/or the transition effect, a visual indication that the lighting effect is delayed.

11. The method according to claim 1, comprising:
whilst the entertainment device is in the active mode, sending to a virtual luminaire executed on a processor and associated with the first luminaire a command to render the lighting effect;
wherein the command is electronically stored by the virtual luminaire and relayed from the virtual luminaire to the first luminaire in response to the entertainment device switching to the inactive mode.

12. The method according to claim 1 wherein the indication of the lighting effect is electronically stored in a memory location local to a device implementing the storing step, or a remote memory location accessed via a network.

13. A non-transitory computer-readable storage medium storing computer-executable code configured to cause at least one processor to perform the method according to claim 1 when the code is executed by the at least one processor.

14. An apparatus for controlling luminaires of a lighting system based on an entertainment device, the apparatus comprising:
a communication interface for determining a current mode of the entertainment device; and
a controller arranged to:
whilst the entertainment device is in an active mode:
control one or more of the luminaires associated with the entertainment device to render an entertainment effect,
receive, while said one or more of the luminaires is rendering said entertainment effect, a lighting instruction identifying a plurality of luminaires and a lighting effect to be rendered by the plurality of luminaires,
determine, in response to the receipt of the lighting instruction, that at least a first luminaire of the plurality of luminaires is one of the luminaires currently rendering the entertainment effect and suspend, in response to said determination, implementation of said lighting instruction by the first luminaire,
control, in response to the receipt of the lighting instruction, at least a second luminaire of the plurality of luminaires, which is not currently rendering the entertainment effect, to implement the lighting instruction by rendering the lighting effect whilst the first luminaire continues to render the entertainment effect and whilst the first luminaire is suspended from implementing the lighting instruction, and
electronically store an indication of the lighting effect; and
in response to the entertainment device switching to an inactive mode, control the first luminaire to implement the lighting instruction by rendering the lighting effect using the electronically stored indication.

15. A system comprising the apparatus of claim 14, a memory and the plurality of luminaires.

* * * * *